Jan. 23, 1968 R. C. MOSELEY ET AL 3,365,549
REPERTORY DIALER UTILIZING AN ELECTRONIC TIMING CONTROL CIRCUIT FOR CONTROLLING THE TAPE DRIVE
Filed Nov. 27, 1964
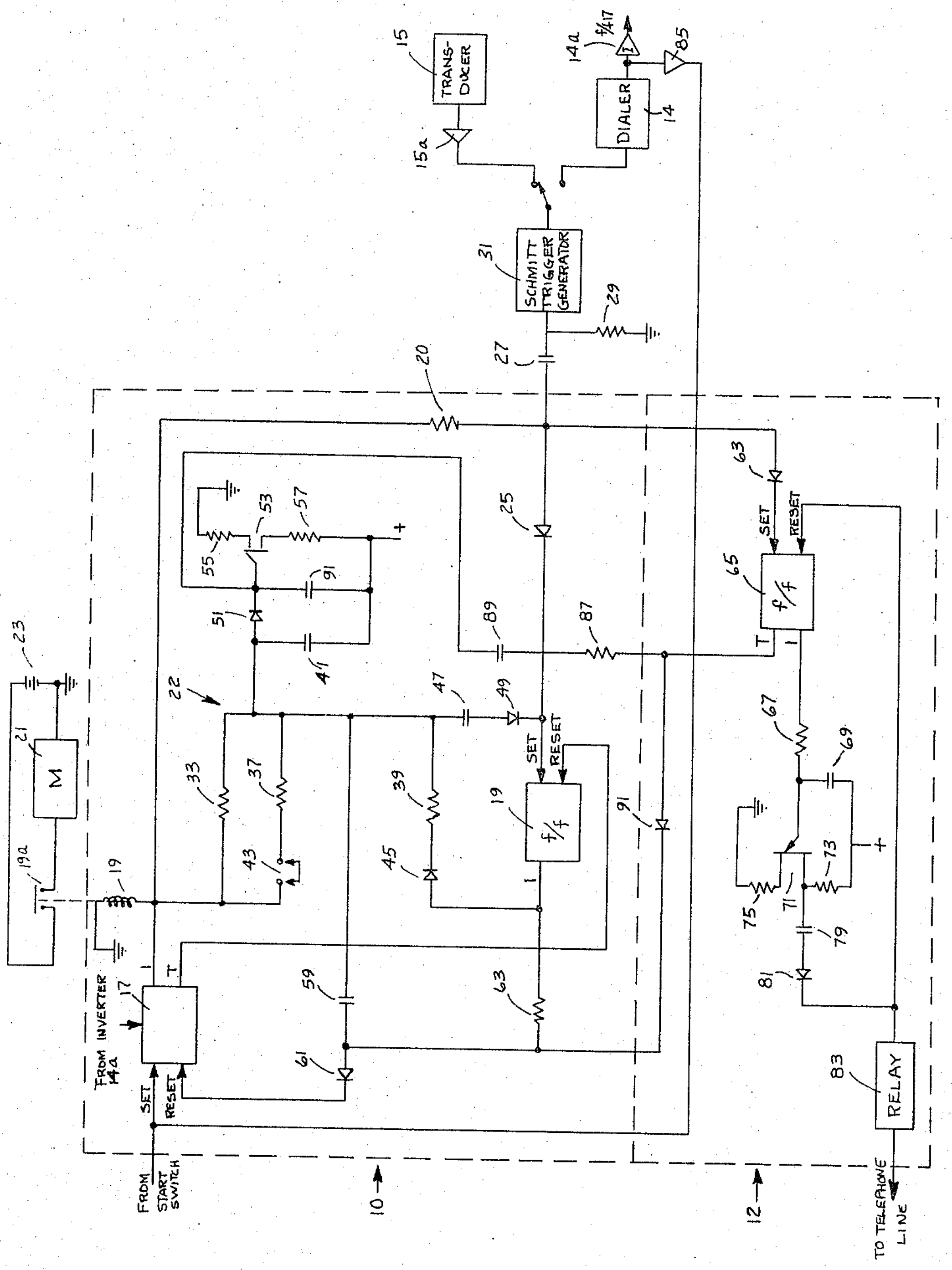
INVENTOR.
ROBIN C. MOSELEY
WALTER REICHL
BY
Philip McFarland
ATTORNEY United States Patent Office 3,365,549
Patented Jan. 23, 1968

3,365,549
REPERTORY DIALER UTILIZING AN ELECTRONIC TIMING CONTROL CIRCUIT FOR CONTROLLING THE TAPE DRIVE

Robin C. Moseley, San Jose, and Walter Reichl, San Mateo, Calif., assignors to DASA Corporation, Andover, Mass., a corporation of California Filed Nov. 27, 1964, Ser. No. 420,849
5 Claims. (Cl. 179—90)

This invention pertains generally to apparatus for recording and reproducing digital information and particularly to apparatus for recording and reproducing telephone dial pulses.

It has been known for some years that magnetic recording techniques are well adapted to repertory dialers for use in telephony.

For example, the repertory dialer described in the application for patent of George S. Lockwood et al., Ser. No. 249,223, of Jan. 3, 1963 (which application is assigned to the same assignee as this application), incorporates a presumably interchangeable cartridge for a magnetic recording medium of tape-like form in combination with a transducer to effect the required recording of signals corresponding to selected telephone numbers. In addition, the cited application describes circuitry for electronicaly reconstituting signals read off the magnetic storage medium to produce appropriately shaped and spaced signals equivalent to the signals produced by conventional dialing mechanisms.

Although practical experience has proven that repertory dialers built following the teachings of the above-cited application are normally satisfactory in operation, randomly occurring variations in the operation of various parts, as the transducer drive mechanism, sometimes result in incorrect results. That is, such repertory dialers may, especially when cartridges are interchanged, fail to operate or call incorrect numbers. Further, to lessen the probability of error in such repertory dialers, it has been necessary to reduce the density of the stored signals below an optimum value. Obviously, such reduction is not to be desired in view of the continuing application of "direct distance" dialing in modern telephone networks.

Therefore, it is an object of this invention to provide an improved repertory dialer incorporating electronic circuitry which compensates automatically for mechanical tolerances in motor drive elements in the device.

Another object of this invention is to provide an improved repertory dialer in which electronic means are provided to generate accurately timed and shaped dial pulses.

Another object of this invention is to provide an improved repertory dialer which is adapted to operate, without any substantial probability of error, with interchangeable cartridges.

Still another object of this invention is to provide an improved repertory dialer meeting the foregoing objects and utilizing conventional components.

These and other objects of this invention are attained generally by providing a transverse magnetic recording device for telephone dial pulses, the relative movement between the transducer and the record medium in such device being derived from an electric motor which is, in turn, controlled by an electronic circuit which is automatically adapted to accommodate for unpredictable variations in the initial position of the transducer to produce optimally spaced and shaped dial pulses. For a more complete understanding of this invention, reference is now made to the accompanying detailed description of a preferred embodiment of this invention as illustrated in the drawings, the single figure of which shows, in simplified block and schematic form, the details of the contemplated circuit.

Before considering the figure, it should be noted that a conventional dialer for a repertory dialer is contemplated for use here. That is, the dialer of the type shown in Kobler, U.S. Patent No. 3,107,287 wherein, in addition to a conventional "pulsing" switch, a "motor start" switch is actuated on release of a dial wheel from its "stop" position and remains actuated during return of such wheel to its "home" position is here contemplated for use. Further, it is contemplated that conventional muting circuits are to be used to eliminate any dial clicks in the telephone with which the now-to-be described repertory dialer is to be used.

Turning now to the figure, it may be seen that the preferred embodiment of this invention generally comprises a transducer motor control circuit 10 and a pulse forming network 12 controlled, selectively, by the output of either a dialer 14 or a transducer 15. The motor control circuit includes a first and a second flip-flop 17, 19 which are connected in a manner to be described to cause a transducer drive motor 21 to be energized in either a "search" mode or a "normal" mode. It will be understood herein that in the "search" mode operation of the motor 21 continues for a fixed period after a start switch (not shown) is actuated or until the occurrence of the first dial pulse in a telephone number. In the "normal" mode, however, the motor 21 is energized for a shorter period of time than in the "search" mode unless a dial pulse occurs.

Flip-flop 17 is a conventional bistable multivibrator except that one side thereof is connected in circuit with the dialer 14. It may be seen, therefore, that a complementary signal to the "motor start" signal out of Kobler dialer may be easily obtained by passing such signals through an inverter 14*a*, thereby disabling the flip-flop 17 during dial rundown. It will become clear, however, that the flip-flop 17 must be adapted to normal operation when the transducer 15 is used. It follows, then, that a conventional switch (not shown) should be in parallel with the output circuit of the inverter 14*a* or the Kobler dialer should be modified in an obvious way (as by adding a normally closed switch operated in synchronism with the "motor start" switch). The flip-flop 17 may conveniently be set manually by a "start" switch (not shown but which may, conveniently, be the "Call" or "Start" switch of a dialer manufactured by DASA Corporation, Andover, Mass., under the trademark "Magicall"). When set, the flip-flop 17 produces an output signal to energize a relay coil 19, a resistor 20 and an RC circuit 22. The relay coil 19, in turn, closes its associated contacts 19*a* to connect a power source 23 in circuit with the transducer drive motor 21. Thus, the transducer 15 is caused to move relative to a record medium (not shown) through any convenient coupling means (not shown). Resistor 20 enables a gate comprising a diode 25 by completing a discharge path for a capacitor 27 through a resistor 29. Thus, any time an output signal is produced by a conventional Schmitt trigger generator 31, the flip-flop 19 is set.

The RC circuit 22 comprises as shown, parallelly connected resistors 33, 37, 39 and a capacitor 41. Resistor 37 is, as indicated by a jumper 43 which preferably is connected only when the dialer 14 is being used. Resistor 39, further, is connected to the complementary output of the flip-flop 19 through a diode 45. The common junction of the resistors 33, 37, 39 is connected through a capacitor 47 and a diode 49 to the "set" input terminal of the flip-flop 19. The common junction of the resistors 33, 37, 39 is also connected, through a diode 51, to a unijunction transistor 53, which is in circuit with the capacitor 41 and a pair of resistors 55, 57. It may be seen that, in the first instance when flip-flop 17 is set, capacitor 41 will exponentially charge to a potential sufficient to cause unijunction transistor 53 to fire, producing a signal pulse to a gate consisting of a capacitor 59 and a diode 61 and a set pulse to the flip-flop 19. Until the latter is set, however, its output, through a resistor 63, disables the diode 61, thereby preventing the pulse caused by the first firing of the unijunction transistor 53 from resetting the flip-flop 17. Gates comprising diodes 25 and 63 prevent the setting of flip-flops 19 and 65 respectively, at times other than when flip-flop 17 is set.

When the flip-flop 19 is set by the first signal from the unijunction transistor 53, the diode 61 is enabled and capacitor 41 is recharged through diode 45 and resistors 39 and 33 in parallel. Thus, unless a pulse signal is received as described hereinafter, the firing potential of the unijunction transistor 53 is reached, causing signal to be passed through the diode 61 to reset flip-flop 17. Reset of the latter then deenergizes relay coil 19 (thereby stopping the transducer drive motor 21) and resets flip-flop 19 to restore the circuit to its original condition.

It will be observed here that the timing of the circuits is determined by the sizes of the resistors 33, 37, 39, the capacitor 41 and the characteristics of the unijunction transistor 53. It is merely a matter of choice, however, to arrange the components to attain any desired length of the "search" in repertory dialer.

The resistor 20 is also connected to a diode 63 in the pulse forming network 12 to enable that portion of the circuit to accept trigger pulses from the Schmitt trigger generator 31 to produce properly formed and spaced dial pulses and, whenever a train of trigger pulses from the Schmitt trigger generator 31 is completed, permit a "stop" signal for the transducer drive motor 21.

To effect the former purpose, trigger pulses are fed through the diode 63 to a flip-flop 65. The positive output of the latter is fed, as shown, through an RC circuit consisting of resistor 67 and capacitor 69 to a unijunction transistor 71 connected in circuit with resistors 73, 75, capacitor 79, diode 81, relay 83 and back to the "reset" terminal of the flip-flop 65. It may be seen, therefore, that the firing potential of the unijunction transistor 71 may be adjusted to set the pulse length of the signal to the relay 83 as desired. In a practical embodiment of this invention adjustment is effected to produce a pulse length of sixty (60) milliseconds. The trigger pulses from the Schmitt trigger generator 31 are spaced at one hundred (100) millisecond intervals. It follows, then, that the standard 60/40 pulsing intervals are produced for telephone dial pulses out of the relay 83.

The function of automatically stopping the transducer drive motor 21 at a given interval, here six hundred (600) milliseconds after the end of a train of dial pulses out of the relay 83, will now be described. Thus, the "start" signal from the dialer 14 is led through the buffer amplifier 85 to the set terminal of the flip-flop 17. As a result, then, the flip-flop 17 causes the relay coil 19 to be energized (making the transducer drive motor 21 operate) and starts the RC circuit 22 to charge toward the potential required to fire unijunction transistor 53. At the end of each dial pulse, however, capacitor 41 is discharged, through the unijunction transistor 53, by a circuit from the complementary output of the flip-flop 65 through a resistor 87, and a capacitor 89 to a capacitor 91 in parallel with capacitor 41. Consequently, capacitor 41, in effect, begins to charge at the end of each dial pulse. The firing of the unijunction transistor 53 is, however, not effective to reset the flip-flop 17 at the end of any dial pulse because a diode 91 is connected as shown to disable the diode 61 when the unijunction transistor fires. The firing of the unijunction transistor 53, however, as described hereinbefore, does ensure that the flip-flop 19 is set. This means then that at least resistors 33 and 39 are in the charging circuit of capacitor 41 after each dial pulse. By proper selection of parameters, then, the unijunction transistor may be caused to fire almost exactly six hundred (600) milliseconds after the last dial pulse. By that time diode 61 is enabled and flip-flop 17 is, therefore, reset by such delayed pulse.

While the purposes of this invention are effected by its illustrated and just described embodiment, a moment's thought will make it clear that many variations may be made without departing from our inventive concepts. Just for example, it is obvious that particular elements such as the unijunction transistors may be replaced by equivalent switching elements. It is felt, therefore, that this invention should not be restricted to its disclosed embodiment but rather should be limited only by the spirit and scope of the appended claims.

What is claimed is:

1. A magnetic repertory dialer wherein a magnetic transducer is driven by an electric motor to effect recording and readout of signals representing telephone numbers, such motor being controlled by a timer comprising:
   (a) a first and a second bistable circuit;
   (b) an electronic switch;
   (c) means, including a first RC circuit connecting the first bistable circuit with the electronic switch and the second bistable circuit, to fire such switch at a first predetermined time after such first bistable circuit assumes its "set" position and thereupon to set the second bistable circuit;
   (d) means, including a second RC circuit connecting the second bistable circuit with the electronic switch, to fire such switch at a second predetermined time after such second bistable circuit assumes its "set" position;
   (e) means for energizing the electric motor when the first bistable circuit is in its set position; and,
   (f) means, responsive to firing of the electronic switch at the second predetermined time to reset the first and the second bistable circuit.

2. A magnetic repertory dialer as in claim 1 having, additionally, means for selctively shortening the time constant of the first RC circuit when the transducer is operated to record signals representing telephone numbers.

3. A magnetic repertory dialer as in claim 2 having, in addition,
   (a) a third bistable circuit responsive to trigger pulses representing the beginning of each pulse in a pulse train to produce dial pulses of a predetermined duration;
   (b) means for connecting an output terminal of the third bistable circuit to the first bistable circuit to set such circuit upon the occurrence of the first of the dial pulses in each train and to reset such first bistable circuit at a third predetermined interval after the last to occur of the dial pulses in each such train.

4. A magnetic repertory dialer as in claim 3 having, in addition, means connected between the third bistable circuit and the electronic switch to fire such switch at the end of each dial pulse out of such third bistable circuit.

5. A timing circuit adapted to control an electric motor utilized to move a magnetic transducer relative to a magnetic recording medium, such circuit comprising:
   (a) a first and a second bistable circuit, each such circuit having a set and a reset condition;
   (b) means connected to the first bistable circuit to energize the electric motor when the first bistable circuit is in its set position;
   (c) an electronic switch;
   (d) means, including an RC circuit connected between the first bistable circuit and the electronic switch, to fire such switch at a predetermined time after the first bistable circuit assumes its set position and whereupon to set the second bistable circuit;
   (e) means, including a gating circuit connected between the electronic switch and the first bistable circuit, to reset the latter when the electronic switch fires;

(f) means, including a delay circuit connected between the second bistable circuit and the gating circuit, to disable the latter for a predetermined time after the second bistable circuit assumes its set position, thereby to enable the gating circuit only after the electronic switch has fired once.

No references cited.

KATHLEEN H. CLAFFY, *Primary Examiner.*

A. H. GESS, *Assistant Examiner.*